US012598232B2

(12) United States Patent
Kurian et al.

(10) Patent No.: US 12,598,232 B2
(45) Date of Patent: Apr. 7, 2026

(54) SYSTEM AND METHOD FOR IMPROVING DATA SECURITY USING DYNAMIC DATA FRAGMENTATION AND DATA GENERATION

(71) Applicant: Bank of America Corporation, Charlotte, NC (US)

(72) Inventors: Manu Kurian, Dallas, TX (US); Michael R. Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/777,937

(22) Filed: Jul. 19, 2024

(65) Prior Publication Data

US 2026/0025428 A1 Jan. 22, 2026

(51) Int. Cl.
| | |
|---|---|
| *G06F 7/00* | (2006.01) |
| *G06F 16/23* | (2019.01) |
| *G06F 17/00* | (2019.01) |
| *H04L 67/1074* | (2022.01) |
| *H04L 67/1097* | (2022.01) |

(52) U.S. Cl.
CPC ...... *H04L 67/1097* (2013.01); *G06F 16/2365* (2019.01); *H04L 67/108* (2013.01)

(58) Field of Classification Search
CPC .............. G06F 16/90339; G06F 16/24; G06F 16/24557; G06F 16/40; G06F 16/433; G06F 16/434; G06F 16/9538; G06F 16/84; G06F 16/3344; G06F 16/2365
See application file for complete search history.

(56) References Cited

U.S. PATENT DOCUMENTS

| | | | |
|---|---|---|---|
| 1,020,640 A | 3/1912 | Davis | |
| 8,655,939 B2 | 2/2014 | Redlich et al. | |
| 8,843,637 B2 | 9/2014 | Dietrich et al. | |
| 8,887,286 B2 | 11/2014 | Dupont et al. | |
| 8,892,513 B2 | 11/2014 | Forsythe | |
| 9,461,876 B2 | 10/2016 | Van Dusen et al. | |
| 9,734,169 B2 | 8/2017 | Redlich et al. | |
| 9,806,718 B2 | 10/2017 | Wallrabenstein | |
| 10,216,537 B2 | 2/2019 | Twitchell, Jr. et al. | |
| 10,339,450 B2 | 7/2019 | David | |
| 11,164,104 B2 | 11/2021 | Ashrafi | |
| 11,312,246 B2 | 4/2022 | Bowman et al. | |
| 2015/0012755 A1 | 1/2015 | Lindteigen | |
| 2017/0206106 A1* | 7/2017 | Twitchell, Jr. | ........ G06F 3/0604 |
| 2019/0042988 A1 | 2/2019 | Brown et al. | |
| 2019/0243836 A1 | 8/2019 | Nanda et al. | |
| 2020/0034742 A1* | 1/2020 | Dirac | ..................... G06N 20/00 |
| 2020/0222010 A1 | 7/2020 | Howard | |

(Continued)

*Primary Examiner* — Tuan A Pham

(57) ABSTRACT

A system for implementing data security using dynamic data fragmentation and storage is disclosed. The system accesses digital content and splits the digital content into a set of data shards according to a splitting rule. The splitting rule indicates that each data shard combined with a respective pseudo data shard should appear as the digital content. The system generates a pseudo data shard such that the first data shard together with the pseudo data shard appears as the digital content. The pseudo data shard comprises pseudo information that is a counterpart to the original information indicated in other data shards. The system communicates the first data shard and the pseudo data shard to a database.

14 Claims, 3 Drawing Sheets

(56) References Cited

U.S. PATENT DOCUMENTS

| | | |
|---|---|---|
| 2020/0405204 A1 | 12/2020 | Howard |
| 2021/0138249 A1 | 5/2021 | Howard |
| 2021/0326118 A1 | 10/2021 | Li |
| 2023/0073976 A1 | 3/2023 | Ackerman et al. |

\* cited by examiner

300

SYSTEM AND METHOD FOR IMPROVING DATA SECURITY USING DYNAMIC DATA FRAGMENTATION AND DATA GENERATION

TECHNICAL FIELD

The present disclosure relates generally to data security, and more specifically to a system and method for improving data security using dynamic data fragmentation and data generation.

BACKGROUND

Users wish to keep certain data secure when communicated via a network. With the rise of data communications via the network, malicious activities, such as cyberattacks have also risen. This has led to emerging and persistent cyberattacks.

SUMMARY

The disclosed system, described in the present disclosure, is particularly integrated into a practical application of improving the data security techniques by implementing machine learning algorithms to dynamically split digital content into a set of data shards such that each data shard, when combined with respective pseudo data shards, appears as the complete digital content.

In current data security systems, data may be stored in a database and protected by various security measures and protocols, such as firewalls and encryptions. However, the current data security systems suffer from several drawbacks. For example, if a bad actor is able to pass the security measures and protocols, they are able to gain access to the data stored in the database. If a bad actor feels that they have not found the complete data, they will keep searching for the data until they find the complete data. Even if the data is split into multiple parts and across different locations, traditional security systems lack the mechanisms to secure the data against persistent cyberattacks because if a bad actor gets hold of one part of the data, they will search for the remaining parts of the data. Thus, the current security systems fall short when faced with persistent cyberattacks. The current security systems also implement a single point of access to the data, which if breached becomes the single point of failure.

The disclosed system provides solutions to these and other technical problems in the realm of data security. Assuming that it is desired to secure the digital content, the disclosed system is configured to split the digital content into a set of data shards according to the splitting rule that indicates that each data shard, when combined with respective pseudo data, should appear as the complete digital content, and that each data shard should be unusable and unrecoverable when accessed without a specific combination protocol. In this process, the disclosed system may generate dynamic pseudo data shards for each data shard such that, when combined with a given data shard, the combination of the given data shard and the pseudo data shards appears to be the complete digital content. In other words, each data shard is appended with dynamic pseudo data shard(s), where the dynamic pseudo data shard(s) resemble or mimic the remaining legitimate data shard(s).

A pseudo data shard may be simulated, artificial, fabricated information that misleads a bad actor into thinking that it is a part of the original digital content. For example, if a bad actor accesses a pseudo data shard, they find records that resemble genuine data formats and content as the legitimate data shard, which leads them to believe they have obtained the original data shard, when in fact they have not.

In some embodiments, the disclosed system may split the digital content into the set of data shards such that each data shard is unusable and unrecoverable when accessed by an unauthorized actor. For example, each data shard may contain a segment of a logical part of the digital content, and without at least some of all of the other data shards and a specific recombination protocol, each data shard remains unusable and unrecoverable by unauthorized users. Additionally, each data shard is appended with its respective pseudo data shards which are configured to further obfuscate the content to appear as legitimate, counterpart data shards.

The disclosed system may generate data blocks, where each data block is a combination of a data shard appended with its respective pseudo data shard(s). The disclosed system may then store each data shard appended with its respective pseudo data shard(s) in a different database compared to other data shards. Thus, even if a bad actor gains access to the first database and the first data block, the deceptive similarity between the pseudo data shard(s) and their counterpart legitimate data shard(s) would lead the bad actor to think that they have accessed the legitimate data and that they have accessed the complete digital content. Thus, the bad actor will not continue to search for the remaining data stored in other databases.

The disclosed system is configured to generate map data to track the distribution and location of each data block across various storage databases. The disclosed system may use the map data to reassemble the legitimate data shards, disregard the pseudo data shards, and compile the legitimate data shards back into the original form of the digital content.

In this manner, the disclosed system provides practical applications for improving data protection and network security by dynamically obfuscating data using pseudo data shards that resemble legitimate data shards. The disclosed system further provides technical advantages, including improved security through data obfuscation and increased resistance against data breaches. In this way, even if a portion of the digital content is compromised, it is unusable and unrecoverable by bad actors.

In some embodiments, a system for implementing data security using dynamic data fragmentation and storage comprises a memory operably coupled with a process. The memory is configured to store digital content, wherein the digital content comprises one or more files, one or more documents, or code. The processor is configured to access the digital content. The processor is further configured to split, using a machine learning algorithm, the digital content into a set of data shards according to a splitting rule. The splitting rule indicates that each data shard, when combined with a respective pseudo data shard, should appear as the digital content. The set of data shards comprises a first data shard and a second data shard. For the first data shard, the processor is further configured to generate a first pseudo data shard such that the first data shard together with the first pseudo data shard appears as the digital content. The first pseudo data shard comprises pseudo information that is a counterpart to the original information indicated in the second data shard. The first data shard and the first pseudo data shard form a first data block. The processor is further configured to communicate the first data block to a first database. The processor is further configured to generate a map data that indicates that the first data block is communicated to the first database, and that the first data block is comprised of the first data shard and the first pseudo data shard.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
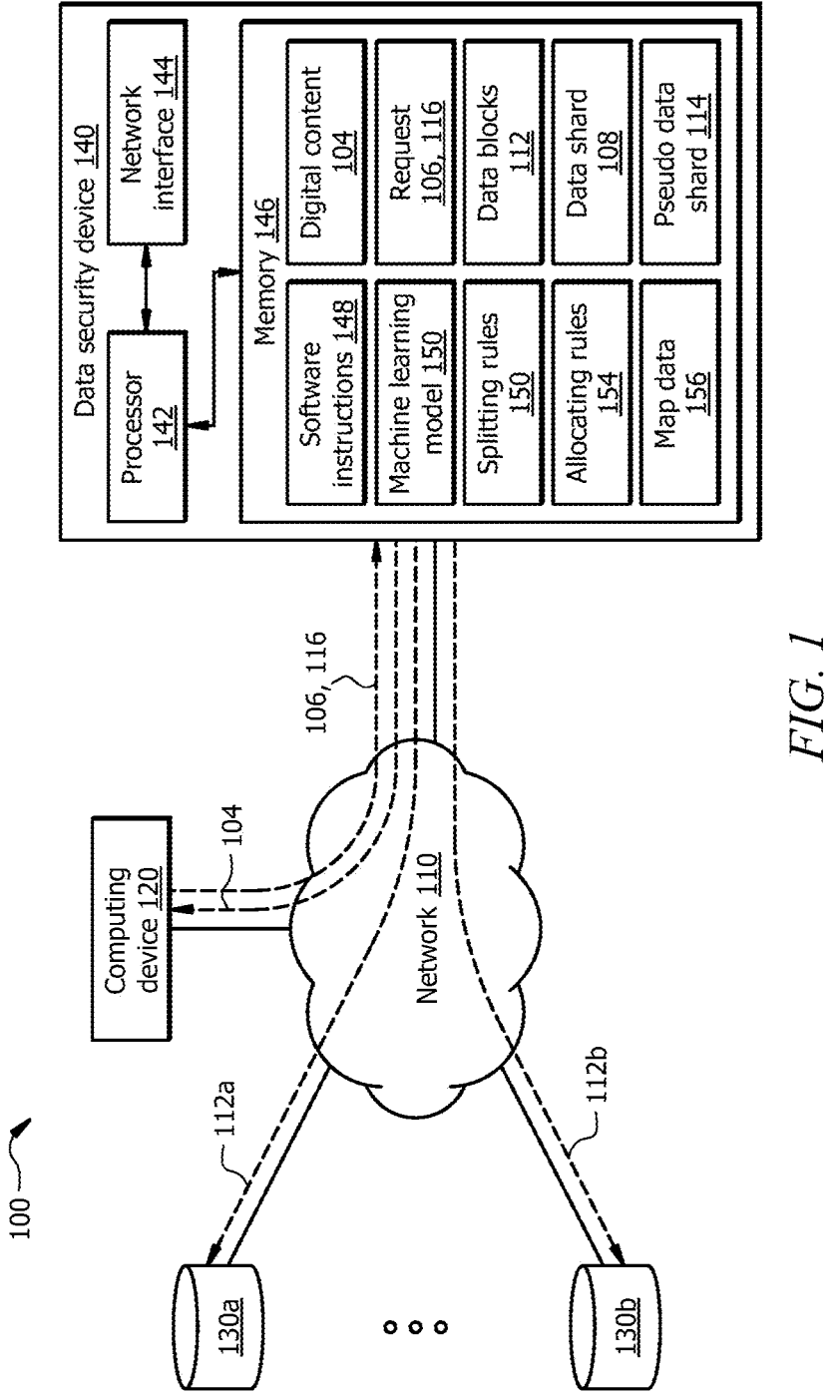
FIG. 1 illustrates an embodiment of a system configured for dynamic data fragmentation and pseudo data generation.
Figure 2:
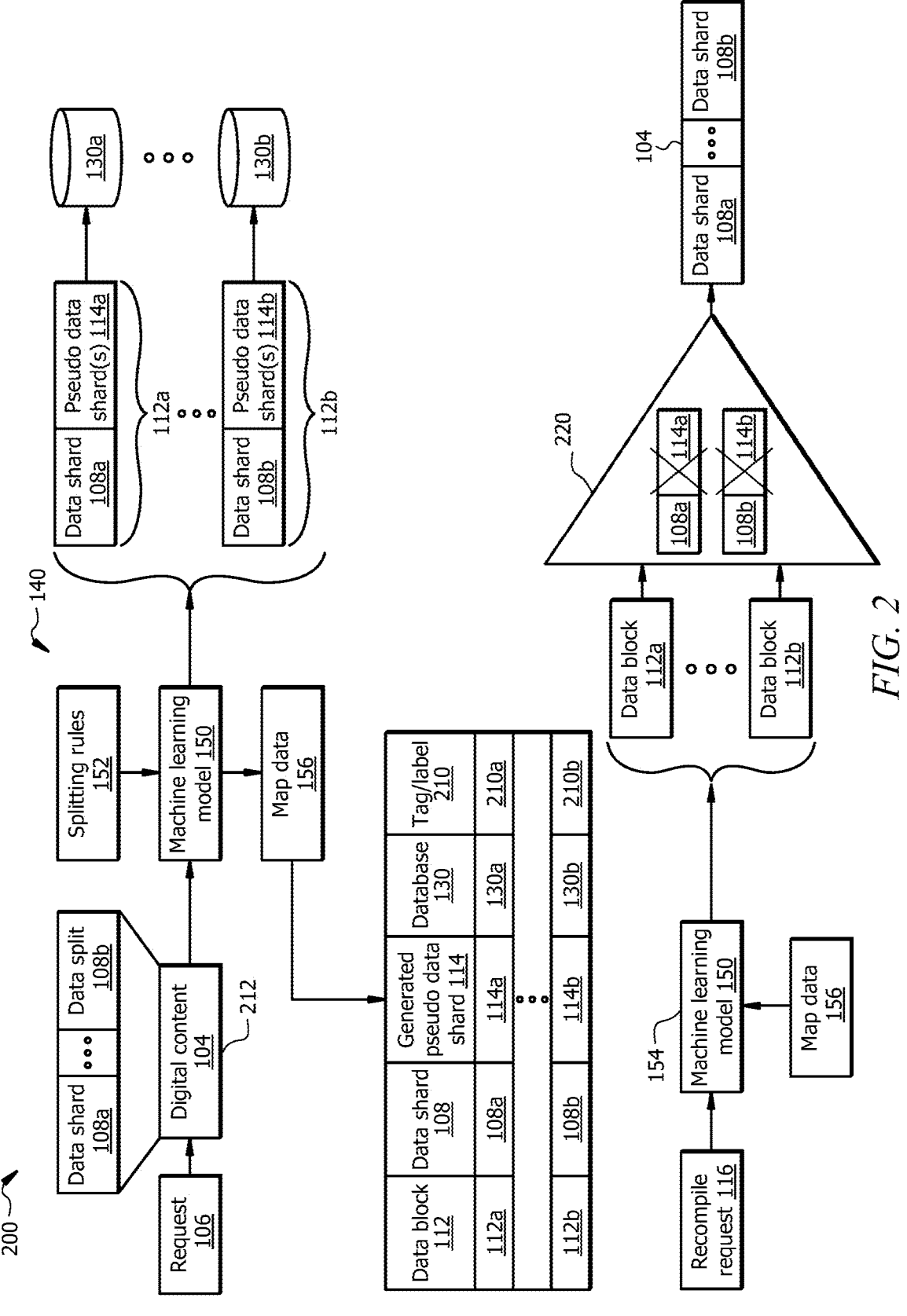
FIG. 2 illustrates an example operational flow of the system of FIG. 1 for dynamic data fragmentation and pseudo data generation.
Figure 3:
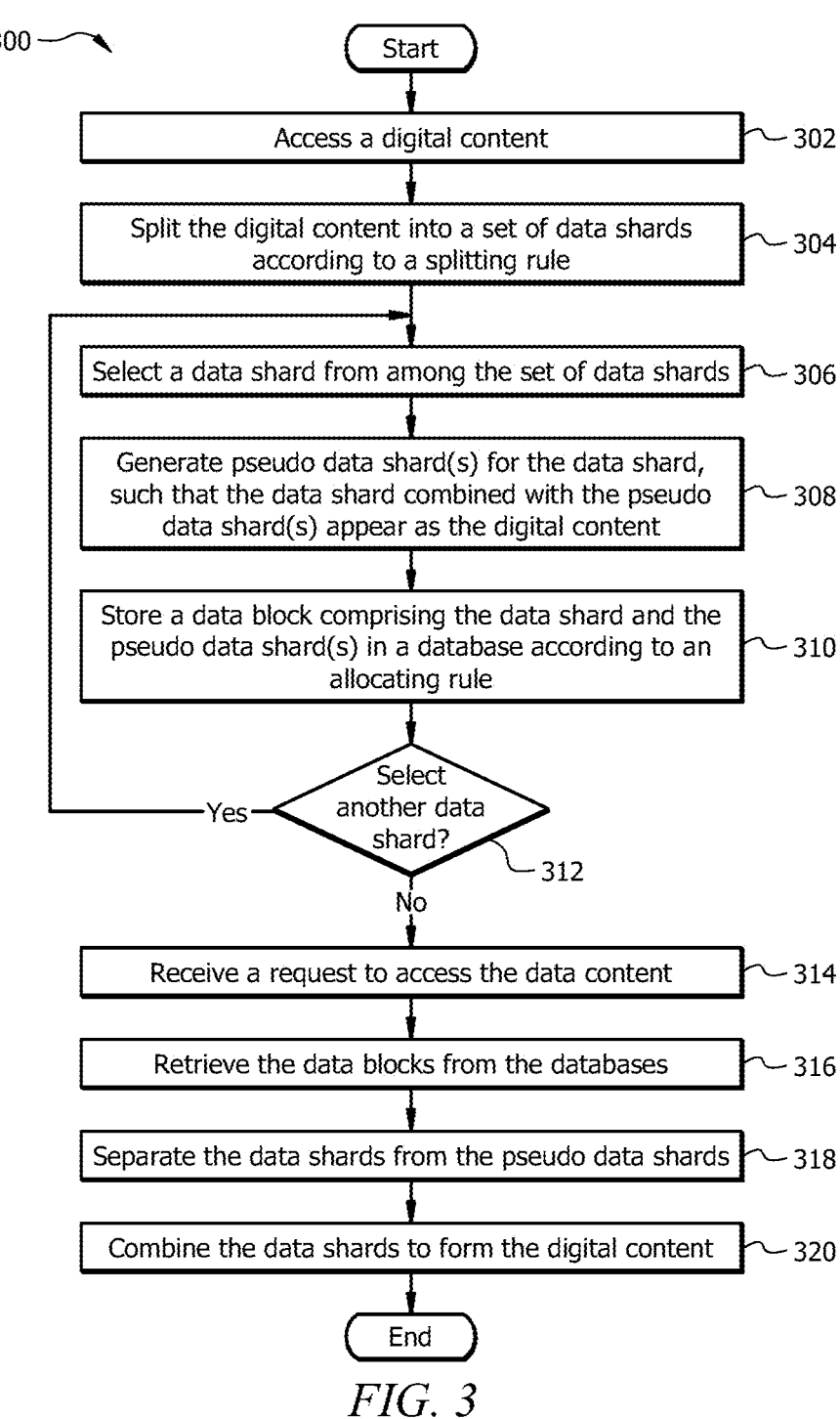
FIG. 3 illustrates an example flowchart of a method for dynamic data fragmentation and pseudo data generation.

As described above, previous technologies fail to provide efficient and reliable solutions to provide a security operation against persistent cyberattacks. Embodiments of the present disclosure and its advantages may be understood by referring to FIGS. 1 through 3. FIGS. 1 through 3 are used to describe systems and methods to implement data security using dynamic data fragmentation and storage, according to some embodiments.

System Overview

FIG. 1 illustrates an embodiment of a system 100 that is generally configured to implement machine learning algorithms to improve data security through dynamic data fragmentation and data generation. In some embodiments, the system 100 comprises a security device 140 communicatively coupled with a computing device 120 and a set of databases 130 (e.g., databases 130*a-b*) via a network 110. Network 110 enables the communication among the components of the system 100. Users 102 may use the computing device 120 to send a request 106 to the data security device 140 to access digital content 104. Each database 130*a-b* is configured to store information that may be used by other components of the system 100. The data security device 140 is configured to implement the security operation by splitting the digital content 104, as described herein. In other embodiments, system 100 may include other elements instead of, or in addition to, those listed above.

In general, the system 100 improves the data security techniques by implementing machine learning algorithms 150 to dynamically split the digital content 104 based on a splitting rule 152 that indicates that each data shard 108, when combined with respective pseudo data shard 114, appears as the complete digital content 104.

In current data security systems, data may be stored in a database and protected by various security measures and protocols, such as firewalls and encryptions. However, the current data security systems suffer from several drawbacks. For example, if a bad actor is able to pass the security measures and protocols, they are able to gain access to the data stored in the database. If a bad actor feels that they have not found the complete data, they will keep looking for the data until they find the complete data. Thus, the current security systems fall short when faced with persistent cyberattacks. The current security systems also implement a single point of access to the data, which if breached becomes the single point of failure.

The disclosed system 100 provides solutions to these and other technical problems in the realm of data security. Assuming that it is desired to secure the digital content 104, the disclosed system 100 is configured to split the digital content 104 into a set of data shards 108 according to the splitting rule 152 that indicates that each data shard 108, when combined with respective pseudo data shard 114, should appear as the complete digital content 104, and that each data shard 108 should be unusable and unrecoverable when accessed without a specific combination protocol. In this process, the disclosed system 100 may generate dynamic pseudo data shards 114 for each data shard 108 such that, when combined with a given data shard 108, the combination of the given data shard 108 and the pseudo data shards 114 appears to be the complete digital content 104. In other words, each data shard 108 is appended with dynamic pseudo data shard(s) 114, where the dynamic pseudo data shard(s) 114 resemble or mimic the remaining legitimate data shard(s) 108 such that each data shard 108 appended with dynamic pseudo data shard(s) 114 appears as the complete digital content 104.

A pseudo data shard 114 may be simulated, artificial, fabricated information that misleads a bad actor into thinking that it is a part of the original digital content 104. For example, if a bad actor accesses a pseudo data shard 114, they find records that resemble genuine data formats and content as the data content 104 and legitimate data shard 108, which leads them to believe they have obtained the original data shard 108, when in fact they have not.

In some embodiments, the disclosed system 100 may split the digital content 104 into the set of data shards 108 such that each data shard 108 is unusable and unrecoverable when accessed by an unauthorized actor. For example, each data shard 108 may contain a segment of a logical part of the digital content 104 that, without at least some of all of the other data shards 108 and a recombination protocol, each data shard 108 remains unusable and unrecoverable by unauthorized users. Additionally, each data shard 108 is appended or mixed with its respective pseudo data shards 114, which are configured to further obfuscate the content to appear as legitimate, counterpart data shard 108.

The disclosed system 100 may generate data blocks 112, where each data block 112 is a combination of a data shard 108 appended with its respective pseudo data shard(s) 114. The disclosed system 100 may then store each data shard 108 appended with its respective pseudo data shard(s) 114 (i.e., each data block 112) in a different database 130 compared to other data shards 108. For example, the disclosed system 100 may store the first data block 112*a* in database 130*a*, and store the second data block 112*b* in database 130*b*. Thus, even if a bad actor gains access to the first database 130*a* and the first data block 112*a*, (which includes a data shard 108 and its respective pseudo data shard(s) 114), the deceptive similarity between the pseudo data shard(s) 114 and their counterpart legitimate data shard(s) 108 would lead the bad actor to think that they have accessed the legitimate data and that they have accessed the complete digital content 104. Thus, the bad actor will not continue to search for the remaining data stored in other databases 130.

The disclosed system 100 is configured to generate a map data 156 to track the distribution and location of each data shard 108 and its corresponding pseudo data shard(s) 114 (i.e., each data block 112*a-b*) across various storage databases 130*a-b*. The disclosed system 100 may use the map data 156 to reassemble the legitimate data shards 108, disregard the pseudo data shards 114, and compile the legitimate data shards 108 back into the original form of the digital content 104.

In this manner, the disclosed system 100 provides practical applications for improving data protection and network security by dynamically obfuscating data using pseudo data shards 114 that resemble legitimate data shards 108. The disclosed system 100 further provides technical advantages, including improved security through data obfuscation and increased resistance against data breaches. In this way, even if a portion of the digital content 104 is compromised, it is unusable and unrecoverable by bad actors.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol, as would be appreciated by one of ordinary skills in the art.

Example Computing Device

The computing device 120 may generally be any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, virtual reality (VR) glasses, a VR device, an augmented reality device, an Internet-of-Things (IOT) device, or any other suitable type of device. The computing device 120 may include a user interface, such as a display, a microphone, a camera, a keypad, or other appropriate terminal equipment usable by user 102.

The computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein.

The user 102 may use the computing device 120 to initiate the communication of the request 106 to secure the digital content 104. In response, the data security device 140 may perform certain operations to split the digital content 104 and store each split into a respective database 130*a-b*. This operation is described in greater detail in FIG. 2. The user 102 may use the computing device 120 to initiate the communication of the request 116 to access the digital content 104. In response, the data security device 140 may reassemble the data shards 108 to form the digital content 104 in its original form.

Database

Each of databases 130*a-b* may be an instance of a database 130. The database 130 generally comprises any storage architecture. Examples of the database 130 include, but are not limited to, a network-attached storage cloud, a storage area network, a data lake, a data warehouse, a storage assembly directly (or indirectly) coupled to one or more components of the system 100. The database 130*a-b* may store a respective data block(s) 122*a-b*.

The database 130*a-b* may be configured to receive and transmit data (e.g., data blocks 112*a-b*) to other components of the system 100, such as the data security device 140. The database 130*a-b* may communicate data blocks 112*a-b* upon request. The database 130*a-b* may be associated with a respective security protocol and access time capability. For example, a database 130*a-b* may be configured with multiple security layers, encryptions, etc. to provide more secure storage for data blocks 112 that require more secure storage because they include sensitive data (e.g., data shard 108 that includes sensitive information). Other databases 130 that are configured with fewer security layers may be more suitable for data blocks 112 that do not require a more secure storage because they do not include sensitive data. In another example, a database 130*a-b* (e.g., high-performance solid-state storage) may be configured with a fast data access time to provide fast data retrieval and processing capabilities for data blocks 112 that are frequently accessed. Other databases 130 that are configured with slower storage mediums (e.g., hard disk drives) may be suitable for data blocks 112 that do not require fast or frequent retrieval.

Data Security Device

The data security device 140 may include one or more hardware computer systems, such as workstations, virtual machines, etc. For example, the data security device 140 may be implemented by a plurality of computing devices using distributed computing and/or cloud computing systems in a network. In some embodiments, the data security device 140 may be one or more servers in a server farm. In some embodiments, the data security device 140 may include one or more servers in one or more data centers, data warehouses, and the like. The data security device 140 may be an instance of one or more servers. In certain embodiments, the data security device 140 may be configured to provide services and resources (e.g., data and/or hardware resources) to the components of the system 100. The data security device 140 (e.g., via the machine learning algorithm 160) may split the digital content 104 into a set of data shards 108 according to splitting rules 152, generate dynamic pseudo data shard(s) 114 to be added to each data shard 108 based on predetermined criteria, such as content type, sensitivity level, and security requirements, store each data shard 108 appended or combined with its respective pseudo data shard(s) 114 (i.e., data blocks 112*a-b*) in a respective database 130*a-b* according to allocating rules 154, and generate a data map 155 that indicate the distribution and splitting details of the data shards 108.

When a request 116 to access the digital content 104 is received from an authorized user 102 (upon verification and authentication of the user 102), the data security device 140 may use the map data 156 to locate each of the data blocks 112*a-b* in their respective databases 130*a-b*. The data security device 140 then retrieves the data blocks and, using a verification process, distinguishes the genuine data shards 108 from the pseudo data shards 114. When the verification is complete, the data security device 140 proceeds to reassemble the genuine data shards 108 according to the original content structure as indicated in the map data 156 and disregards the pseudo data shards 114.

The data security device 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the data security device 140 described herein. In this way, processor 142 may be a special-purpose computer configured to implement the functions disclosed herein. In an embodiment, the processor 142 is implemented using logic units, FPGAs, ASICs, DSPs, or any other suitable hardware. The processor 142 is configured to operate as described in FIGS. 1 through 3. For example, the processor 142 may be configured to perform one or more operations of the operational flow 200 described in FIG. 2, and one or more operations of the method 300 as described in FIG. 3.

Network interface 144 is configured to enable wired and/or wireless communications. The network interface 144 may be configured to communicate data between the data security device 140 and other devices, systems, or domains of the system 100. For example, the network interface 144 may comprise an NFC interface, a Bluetooth interface, a Zigbee interface, a Z-wave interface, a radio-frequency identification (RFID) interface, a WiFi interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an overflow data storage device to store programs, when such programs are selected for execution, and to store instructions and data that are read during program execution. The memory 146 may store any of the information described in FIGS. 1 through 3 along with any other data, instructions, logic, rules, or code operable to implement the function(s) described herein when executed by processor 142. For example, the memory 146 may store software instructions 148, machine learning algorithm 150, splitting rules 152, allocating rules 154, map data 156, digital content 104, requests 106, requests 116, data blocks 112, data shards 108, pseudo data shards 114, and/or any other data or instructions. The software instructions 148 may comprise any suitable set of instructions, logic, rules, or code operable to execute the processor 142 and perform the functions described herein, such as some or all of those described in FIGS. 1 through 3.

The machine learning algorithm 150 may be implemented by the processor 142 executing the software instructions 148 and is generally configured to analyze and digest an incoming digital content 104 that is requested to be secured by the dynamic fragmentation security process to understand its structure, logical parts, and other characteristics (collectively referred to herein as features 212) and determine how it should be split such that each data shard 108 is unusable and unrecoverable if accessed without a defined recombination protocol (indicated in the map data 156), generate dynamic pseudo data shard(s) 114 for each data shard 108 to generate a data block 112 such that each data block 112 appears (to a human) as the complete digital content 104, and reassemble the data shards 108 according to the map data 156 to form the digital content 104 in its original format.

The machine learning algorithm 150 may comprise a support vector machine, neural network, random forest, k-means clustering, etc. The machine learning algorithm 150 may be implemented by a plurality of neural network (NN) layers, convolutional NN (CNN) layers, long-short-term-memory (LSTM) layers, bi-directional LSTM layers, recurrent NN (RNN) layers, generative adversarial networks (GANs), deep learning models and the like. In some examples, the machine learning algorithm 150 may be implemented by natural language processing (NLP), data processing, text recognition, generative text processing, programming code processing, programming code generation, etc.

In certain embodiments, the machine learning algorithm 150 may perform code segmentation, network traffic segmentation, word segmentation, sentence segmentation, word tokenization, sentence tokenization, and analysis on a given data (e.g., digital content 104) to detect its features 212, such as data structure, data format, schema, logical parts, etc.

The spitting rule 152 may include a rule that indicates each data shard 108 is unusable and unrecoverable without the recombination protocol indicated in the map data 156. For example, the combination protocol may involve a specific sequence and verification process, where each data shard 108 should be aligned and matched according to a predetermined pattern as in the data content 104 that the data security device 140 recognizes. The splitting rule 152 may further include a rule that indicates each data shard 108, when combined with its respective pseudo data shard(s) 114, should appear as the complete digital content 104. In other words, each data block 112 should appear as the complete digital content 104.

Allocating rule 154 may indicate that a selection criterion for communicating a given data block 112 to a given database 130 comprises a security level and frequency access associated with the data block 112. For example, the allocating rules 154 may include a rule that indicates that data block 112, which includes highly sensitive information such as personal data, should be stored in databases 130 with stronger security protocols, and vice versa. In another example, the allocating rules 154 may include a rule that indicates data blocks 112 that are accessed more frequently (e.g., compared to others) may be allocated to databases 130 with faster access times compared to other databases 130, and vice versa. These allocating rules 154 may be combined for data blocks 112 with various security and access needs. The digital content 104 may include one or more files, one or more documents, code (such as source code that includes code lines), and the like.

Operational Flow for Dynamic Data Fragmentation and Pseudo Data Generation

FIG. 2 illustrates an example operational flow 200 of system 100 (see FIG. 1) for dynamic data fragmentation and pseudo data generation to improve the security of digital content 104, according to certain embodiments. The operational flow 200 may begin when a request 106 to perform the security operation on the data content 104 is received. For example, a user 102 may send the request 105 from the computing device 120 (see FIG. 1) to the data security device 140.

In response, the data security device 140 may access the digital content 104 and evaluate the digital content 104, e.g., via the machine learning algorithm 150. In this process, the machine learning algorithm 150 may extract a set of features 212 from the digital content, where the features 212 indicate the logical parts, data structure, data format, schema, and other characteristics of the digital content 104. The machine learning algorithm 150 uses the features 212 to determine how the digital content 104 should be split to comply with the splitting rules 154.

In some embodiments, the machine learning algorithm 150, using the features 212 of the digital content 104 and the splitting rules 152, may split the digital content 104 into a set of data shards 108. In this process, the machine learning algorithm 150 may split the digital content 104 according to the splitting rules 154 such that each data shard 108, when combined with respective pseudo data shard(s) 114, should appear (to a human) as the complete digital content 104, and each data shard 108 should be unusable and unrecoverable without the specific recombination protocol indicated in the map data 156. In the example of FIG. 2, assume that the machine learning algorithm 150 splits the digital content 104 into data shards 108*a-b*, where the data shards 108*a-b* may include two or more data shards 108. In some embodiments, splitting of the digital content 104 may be such that each data shard 108*a-b* comprises at least a portion of each of the logical parts of the digital content 104. In some embodiments, splitting of the digital content 104 may be such that each data shard 108*a-b* comprises a portion of one or more of the logical parts of the digital content 104.

Generating Pseudo Data Shards for Each Split

The machine learning algorithm 150 may generate one or more dynamic pseudo data shards 114 for each of data shards 108*a-b*. In an example, assume that the first data shard 108*a* includes at least a portion of a first logical part of the digital content 104, and the digital content 104 includes three logical parts. Thus, in this example, the machine learning algorithm 150 may generate one or more pseudo data shards 114*a* that resemble the remaining two logical parts and the remaining part of the first logical part of the digital content 104 that is not included in the first data shard 108*a*. Thus, when the first data shard 108*a* is combined with the generated pseudo data shard(s) 114*a*, they may form and appear as the complete digital content 104. The generated pseudo data shard(s) 114*a* may include pseudo, misleading, simulated, fabricated, or artificial information that is counterpart to the legitimate and original information indicated in the remaining logical parts of the digital content 104 (indicated in the data shard 108*b* and other data shards 108 besides data shard 108*b*).

In generating a pseudo data shard 114, the machine learning algorithm 150 may analyze the extracted features 212 of the digital content 104 which indicate the pattern, data distribution, data format, data type, and schema of different parts of the digital content 104 to create simulated and artificial content (e.g., text, numbers, etc.) that follow a similar data format, pattern, and schema. For example, the machine learning algorithm 150 may use generative adversarial networks and/or deep learning models to generate the pseudo data shards 114*a* that resemble the attributes of the real data shard 108, such as syntax, numerical data format, etc. For example, if the original data shard 108*b* includes numerical values, the machine learning algorithm 150 may generate similar (random) numerical sequences that do not correspond to the original numerical values but maintain a consistent appearance and output the generated numerical sequences as the pseudo data shard 114*a* that is the counterpart of the data shard 108*b*. The data shard 108*a* combined with its respective pseudo data shards 114*a* appear as the complete digital content 104 and form the data block 112*a*.

The machine learning algorithm 150 may perform similar operations for other data shards 108, including data shard 108*b*. For example, assuming that the data shard 108*b* includes a part of the second logical part of the digital content 104 out of all three logical parts of the digital content 104, the machine learning algorithm 150 may generate additional pseudo data shards 114*b* that mimic the first and third logical parts, and the remainder of the second logical part not included in data shard 108*b*. The pseudo data shards 114*b* may include pseudo, misleading, simulated, fabricated, or artificial information that is counterpart to the legitimate and original information indicated in the remaining logical parts of the digital content 104 (indicated in the data shard 108*a* and other data shards 108 besides data shard 108*b*). Thus, when data shard 108*b* is combined with its corresponding pseudo data shards 114*b*, it similarly appears as the complete digital content 104. The data shard 108*b* combined with its respective pseudo data shards 114*b* may form the data block 112*b*.

In an example, where the digital content 104 is split into two data shards 108*a* and 108*b*, the machine learning algorithm 150 may generate the pseudo data shard 114*a* for the first data shard 108*a*, where the pseudo data shard 114*a* includes pseudo information that is counterpart to the original information indicated in the second data shard 108*b*, the first data shard 108*a* and the pseudo data shard 114*a* form and appear as the digital content 104. Likewise, for the second data shard 108*b*, the machine learning algorithm 150 may generate the pseudo data shard 114*b*, where the pseudo data shard 114*b* includes pseudo information that is a counterpart of the original information indicated in the first data shard 108*a*. Together, the second data shard 108*b* and the pseudo data shard 114*b* form and appear as the digital content 104.

Allocating the Data Shards to Databases

The data security device 140 may determine where each data block 112a-b is to be communicated and stored based on the allocating rules 154. The data security device 140 communicates the first data block 112a to the database 130a based on the frequency access and security level of the data block 112a (or the data shard 108a). Likewise, the data security device 140 communicates the second data block 112b to the database 130b based on the frequency access and security level of the data block 112b (or the data shard 108b). The data security device 140 may communicate other data blocks 112 to their respective databases 130.

The data security device 140 may generate the map data 156. The map data 156 may include a row entry for each data block 112a-b. For example, a first row entry of the map data 156 may indicate that data block 112a includes the data shard 108a and pseudo data shard 114b, the data block 112a is stored in the database 130a, and the pseudo data shard 114a is associated with a pseudo indication 210a so that, in the combining process, the pseudo data shard 114a is disregarded. The second row entry of the map data 156 may indicate the data block 112b includes the data shard 108b and pseudo data shard 114b, the data block 112b is stored in the database 130b, and the pseudo data shard 114b is associated with a pseudo indication 210b so that, in the combining process, the pseudo data shard 114b is disregarded.

Recombining the Data Shards

The data security device 140 may recombine the data shards 108a-b, e.g., in response to the recombine request 116. The data security device 140 may receive the recombine request 116 from the computing device 120 when initiated by the user 102. In response, the data security device 140 (e.g., via the machine learning algorithm 150) may determine, by referencing the map data 156, where each data block 112a-b (or each data shard 108a-b) is stored or resides.

In the example of FIG. 2, the data security device 140 may determine that the first data block 112a is stored or resides in the first database 130a. In response, data security device 140 may retrieve the first data block 112a from the first database 130a, and separate the data shard 108a from the pseudo data shard 114a.

In some embodiments, the data security device 140 may feed the data block 112a to a neural network of the machine learning algorithm 150 to extract features 212 from it and determine, based on the extracted features 212, which part is the data shard 108a and which part is the pseudo data shard 114a.

In some embodiments, the data security device 140 may identify the data shard 108a by using specific identifiers or metadata that data security device 140 embedded within each data shard 108a and pseudo data shard 114a during the initial fragmentation process, respectively. The data security device 140 may use embedded metadata, such as checksums, timestamps, or unique cryptographic signatures associated with each of the data shard 108a and pseudo data shard 114a, to identify the data shard 108a and pseudo data shard 114a, respectively. For example, a checksum may be used to verify that the data shard has not been altered since its creation, timestamps may help track the age and version of the data, and cryptographic signatures may be defined to uniquely identify each data shard 108a and pseudo data shard 114a, respectively.

Similarly, the data security device 140 may determine that the second data block 112b is stored, resided in the second database 130b, retrieve the second data block 112b from the second database 130b, and separate the data shard 108b from the pseudo data shard 114b. The data security device 140 may disregard the pseudo data shards 114a-b because they are tagged or labeled with the pseudo indication 210a-b as indicated in the map data 156, respectively. The data security device 140 may combine the data shards 108a-b to form the digital content 104 in a combining operation 220.

In some embodiments, the data security device 140 may track the data blocks 112a-b by a unique digital signature associated with each pseudo data shard 114a-b, respectively. The data security device 140 may monitor and track activities associated with the data blocks 112a-b. Thus, if a bad actor accesses a data block 112 and subsequently uses it, for example, to exfiltrate data from other users, the data security device 140 may detect the unauthorized activity through the mismatch or anomalous behavior associated with the data block 112. In response, the data security device 140 may perform countermeasure actions, such as isolating the affected data block 112, revoking access privileges associated with it, identifying an Internet Protocol (IP) address associated with a source device where the data block 112 is used, logging the activities, among others.

Method for Dynamic Data Fragmentation and Data Generation

FIG. 3 illustrates an example flowchart of a method 300 for dynamic data fragmentation and data generation, according to some embodiments. Modifications, additions, or omissions may be made to method 300. Method 300 may include more, fewer, or other operations. For example, operations may be performed in parallel or in any suitable order. While at times it is discussed that the system 100, data security device 140, or components of any thereof perform some operations, any suitable system or components of the system may perform one or more operations of the method 300. For example, one or more operations of method 300 may be implemented, at least in part, in the form of software instructions 148 of FIG. 1 stored on a tangible non-transitory machine-readable medium (e.g., memory 146 of FIG. 1) that, when run by one or more processors (e.g., processor 142 of FIG. 1), may cause the one or more processors to perform operations 302-324.

At operation 302, the data security device 140 accesses a digital content 104, similar to that described in FIGS. 1 and 2. At operation 304, the data security device 140 splits the digital content 104 into a set of data shards 108a-b according to a splitting rule 152, similar to that described in FIG. 2.

At operation 306, the data security device 140 selects a data shard 108a-b from among the set of data shards 108a-b. The data security device 140 may iteratively select a data shard 108a-b until no data shard 108 is left for evaluation. At operation 308, the data security device 140 generates pseudo data shard(s) 114 for the data shard 108 such that the data shard 108, combined with the pseudo data shard(s) 114, appears as the digital content 104, similar to that described in FIG. 2.

At operation 310, the data security device 140 stores the data block 112 comprising the data shard 108 and the pseudo data shards 114 in a database 130 according to an allocating rule 154, similar to that described in FIG. 2.

At operation 312, the data security device 140 determines whether to select another data shard 108. If at least one data shard 108 is left, the data security device 140 may select another data shard 108. If it is determined that at least one data shard 108 is left for evaluation, the method 300 returns to operation 306. Otherwise, the method 300 proceeds to operation 314.

At operation 314, the data security device 140 receives a request 116 to access the digital content 104, similar to that described in FIG. 2. At operation 316, the data security device 140 retrieves the data blocks 112*a-b* from the databases 130*a-b*. At operation 320, the data security device 140 separates the data shards 108*a-b* from the pseudo data shards 112*a-b*, respectively. At operation 322, the data security device 140 combines the data shards 108*a-b* to form the digital content 104.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system, or certain features 212 may be omitted or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled, directly coupled, or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system for implementing data security using dynamic data fragmentation and storage, comprising:
   a memory configured to store digital content, wherein the digital content comprises one or more files, one or more documents, or code; and
   a processor, operably coupled to the memory, and configured to:
   access the digital content;
   split, using a machine learning algorithm, the digital content into a set of data shards according to a splitting rule, wherein:
      the splitting rule indicates that each data shard, when combined with a respective pseudo data shard, should appear as the digital content;
      the set of data shards comprises a first data shard and a second data shard;
   for the first data shard, generate a first pseudo data shard such that the first data shard together with the first pseudo data shard appear as the digital content, wherein:
      the first pseudo data shard comprises pseudo information that is a counterpart to original information indicated in the second data shard; and
      the first data shard and the first pseudo data shard form a first data block;
   communicate the first data block to a first database;
   generate a map data that indicates that the first data block is communicated to the first database, and that the first data block is comprised of the first data shard and the first pseudo data shard;
   for the second data shard, generate a second pseudo data shard, such that the second data shard together with the second pseudo data shard appear as the digital content, wherein:
      the second pseudo data shard comprises pseudo information that is a counterpart to original information indicated in the first data shard; and
      the second data shard and the second pseudo data shard form a second data block; and
   communicate the second data block to a second database;
   wherein the map data further indicates that the second data block is communicated to the second database, and that the second data block is comprised of the second data shard and the second pseudo data shard;
   receive a request to access the digital content;
   in response to receiving the request:
      determine, by referencing the map data, that the first data block resides within the first database;
      retrieve the first data block from the first database;
      separate the first data shard from the first pseudo data shard;
      determine, by referencing the map data, that the second data block resides within the second database;
      retrieve the second data block from the second database;
      separate the second data shard from the second pseudo data shard; and
      combine the first data shard and the second data shard to form the digital content.

2. The system of claim 1, wherein splitting, using the machine learning algorithm, the digital content into the set of data shards according to the splitting rule, is in response to:
   extracting a set of features from the digital content, wherein the set of features indicates a set of logical parts of the digital content; and
   splitting the digital content such that each of the set of data shards comprises at least a portion of each of the set of logical parts.

3. The system of claim 1, wherein splitting, using the machine learning algorithm, the digital content into the set of data shards according to the splitting rule, is in response to:
   extracting a set of features from the digital content, wherein the set of features indicates a set of logical parts of the digital content; and
   splitting the digital content such that each of the set of data shards comprises at least a portion of one or more of the set of logical parts.

4. The system of claim 1, wherein communicating the first data block to the first database is based, at least in part, upon an allocating rule, wherein the allocating rule indicates that a selection criteria for communicating a given data block to a given database comprises a security level or a frequency access associated with the first data block.

5. The system of claim 1, wherein:
   the first pseudo data shard is tagged with a pseudo indication such that, when a recombination request for the digital content is received, the first pseudo data shard is disregarded; and
   the map data further indicates that the first pseudo data shard is tagged with the pseudo indication.

6. A method for implementing data security using dynamic data fragmentation and storage, comprising:

accessing digital content, wherein the digital content comprises one or more files, one or more documents, or code;

splitting, using a machine learning algorithm, the digital content into a set of data shards according to a splitting rule, wherein:

the splitting rule indicates that each data shard, when combined with a respective pseudo data shard, should appear as the digital content;

the set of data shards comprises a first data shard and a second data shard;

for the first data shard, generating a first pseudo data shard such that the first data shard together with the first pseudo data shard appear as the digital content, wherein:

the first pseudo data shard comprises pseudo information that is a counterpart to original information indicated in the second data shard; and the first data shard and the first pseudo data shard form a first data block;

communicating the first data block to a first database; and generating a map data that indicates that the first data block is communicated to the first database, and that the first data block is comprised of the first data shard and the first pseudo data shard;

for the second data shard, generating a second pseudo data shard such that the second data shard together with the second pseudo data shard appear as the digital content, wherein:

the second pseudo data shard comprises pseudo information that is a counterpart to original information indicated in the first data shard; and the second data shard and the second pseudo data shard form a second data block; and communicating the second data block to a second database;

wherein the map data further indicates that the second data block is communicated to the second database, and that the second data block is comprised of the second data shard and the second pseudo data shard;

receiving a request to access the digital content;

in response to receiving the request:

determining, by referencing the map data, that the first data block resides within the first database;

retrieving the first data block from the first database;

separating the first data shard from the first pseudo data shard;

determining, by referencing the map data, that the second data block resides within the second database;

retrieving the second data block from the second database;

separating the second data shard from the second pseudo data shard; and combining the first data shard and the second data shard to form the digital content.

7. The method of claim 6, wherein splitting, using the machine learning algorithm, the digital content into the set of data shards according to the splitting rule, is in response to:

extracting a set of features from the digital content, wherein the set of features indicates a set of logical parts of the digital content; and splitting the digital content such that each of the set of data shards comprises at least a portion of each of the set of logical parts.

8. The method of claim 6, wherein splitting, using the machine learning algorithm, the digital content into the set of data shards according to the splitting rule, is in response to:

extracting a set of features from the digital content, wherein the set of features indicates a set of logical parts of the digital content; and splitting the digital content such that each of the set of data shards comprises at least a portion of one or more of the set of logical parts.

9. The method of claim 6, wherein communicating the first data block to the first database is based, at least in part, upon an allocating rule, wherein the allocating rule indicates that a selection criteria for communicating a given data block to a given database comprises a security level or a frequency access associated with the first data block.

10. The method of claim 6, wherein:

the first pseudo data shard is tagged with a pseudo indication such that when a recombination request for the digital content is received, the first pseudo data shard is disregarded; and the map data further indicates that the first pseudo data shard is tagged with the pseudo indication.

11. A non-transitory computer-readable medium storing instructions that, when executed by a processor, cause the processor to:

access digital content, wherein the digital content comprises one or more files, one or more documents, or code;

split, using a machine learning algorithm, the digital content into a set of data shards according to a splitting rule, wherein:

the splitting rule indicates that each data shard, when combined with a respective pseudo data shard, should appear as the digital content;

the set of data shards comprises a first data shard and a second data shard;

for the first data shard, generate a first pseudo data shard such that the first data shard together with the first pseudo data shard appear as the digital content, wherein:

the first pseudo data shard comprises pseudo information that is a counterpart to original information indicated in the second data shard; and the first data shard and the first pseudo data shard form a first data block;

communicate the first data block to a first database; and generate a map data that indicates that the first data block is communicated to the first database, and that the first data block is comprised of the first data shard and the first pseudo data shard;

for the second data shard, generate a second pseudo data shard such that the second data shard together with the second pseudo data shard appear as the digital content, wherein:

the second pseudo data shard comprises pseudo information that is a counterpart to original information indicated in the first data shard; and the second data shard and the second pseudo data shard form a second data block; and communicate the second data block to a second database;

wherein the map data further indicates that the second data block is communicated to the second database, and that the second data block is comprised of the second data shard and the second pseudo data shard;

receive a request to access the digital content;

in response to receiving the request:

determine, by referencing the map data, that the first data block resides within the first database;

retrieve the first data block from the first database;

separate the first data shard from the first pseudo data shard;

determine, by referencing the map data, that the second data block resides within the second database;

retrieve the second data block from the second database;

separate the second data shard from the second pseudo data shard; and combine the first data shard and the second data shard to form the digital content.

12. The non-transitory computer-readable medium of claim 11, wherein splitting, using the machine learning algorithm, the digital content into the set of data shards according to the splitting rule, is in response to:

extracting a set of features from the digital content, wherein the set of features indicates a set of logical parts of the digital content; and splitting the digital content such that each of the set of data shards comprises at least a portion of each of the set of logical parts.

13. The non-transitory computer-readable medium of claim 11, wherein splitting, using the machine learning algorithm, the digital content into the set of data shards according to the splitting rule, is in response to:

extracting a set of features from the digital content, wherein the set of features indicates a set of logical parts of the digital content; and splitting the digital content such that each of the set of data shards comprises at least a portion of one or more of the set of logical parts.

14. The non-transitory computer-readable medium of claim 11, wherein communicating the first data block to the first database is based, at least in part, upon an allocating rule, wherein the allocating rule indicates that a selection criteria for communicating a given data block to a given database comprises a security level or a frequency access associated with the first data block.

\* \* \* \* \*